July 24, 1951 S. E. HILL ET AL 2,562,098
VEHICLE AXLE AND REACH STRUCTURE
Filed July 25, 1947 3 Sheets-Sheet 1

Inventors
Stanley E Hill
William L. Zink
by: Louis Sheldon
Atty.

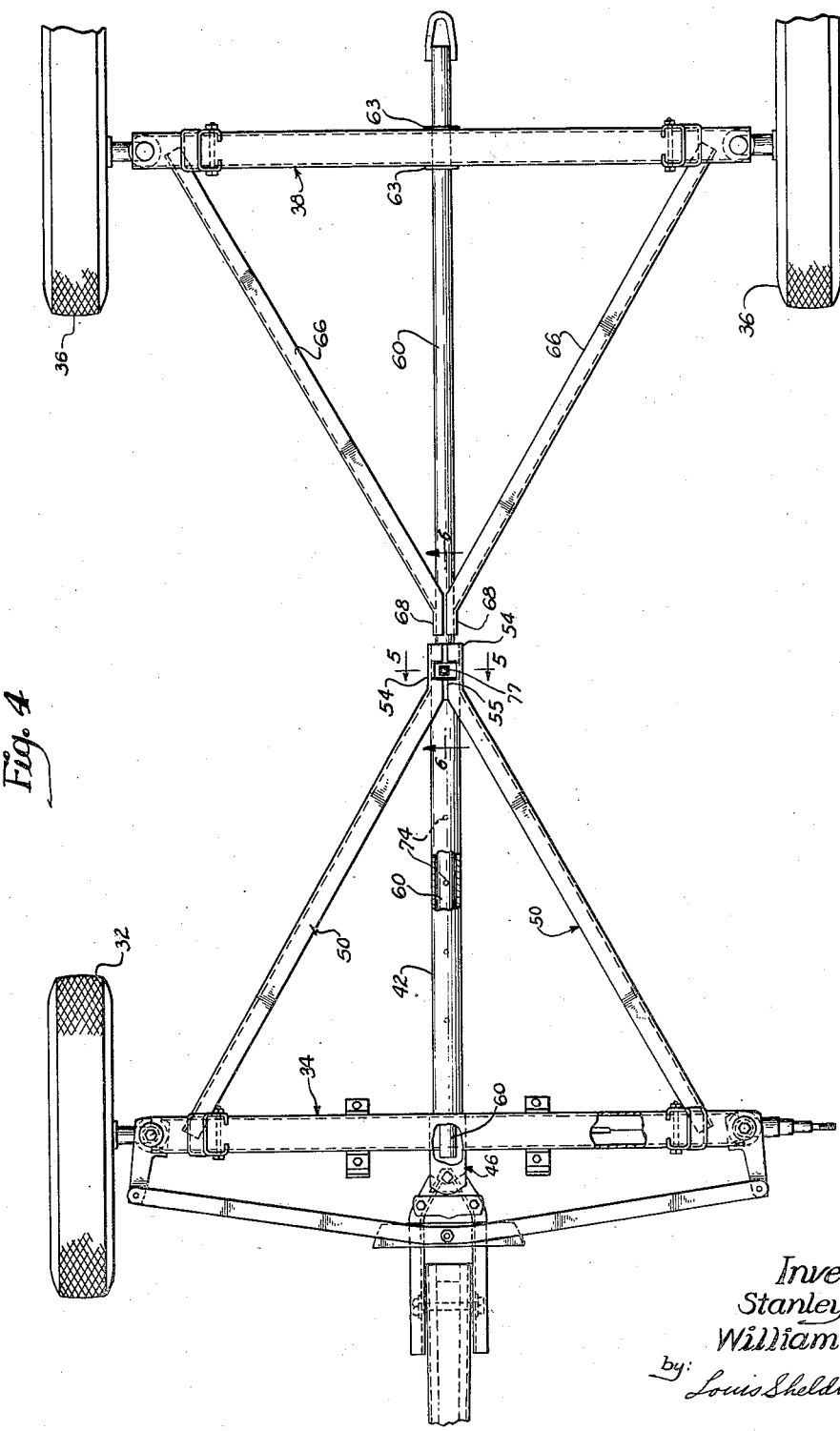

July 24, 1951 S. E. HILL ET AL 2,562,098
VEHICLE AXLE AND REACH STRUCTURE
Filed July 25, 1947 3 Sheets-Sheet 3
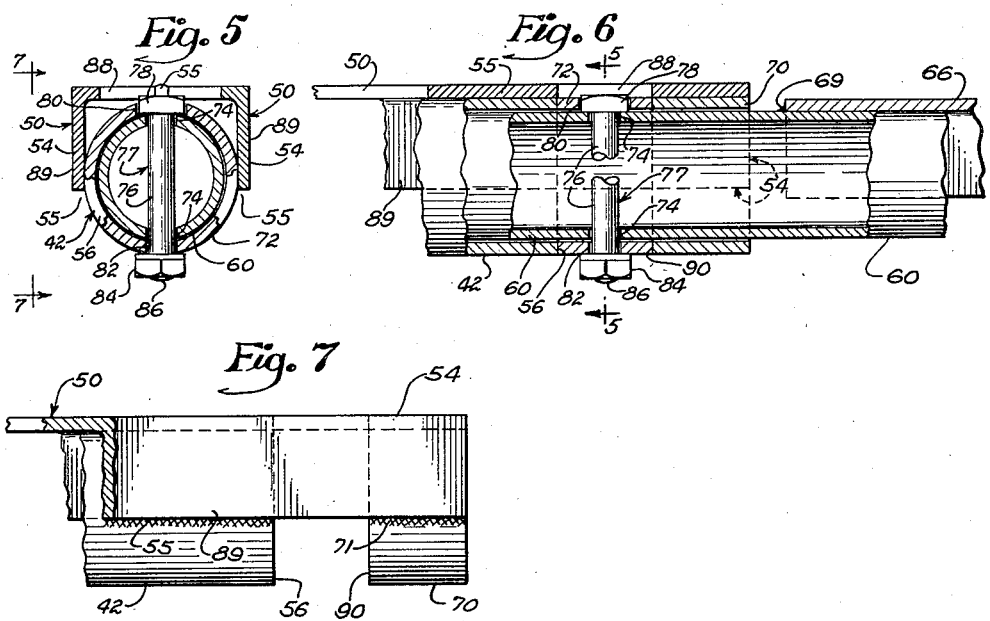
Inventors
Stanley E Hill
William L. Zink
by: Louis Sheldon
Atty.

Patented July 24, 1951

2,562,098

UNITED STATES PATENT OFFICE 2,562,098

VEHICLE AXLE AND REACH STRUCTURE

Stanley E. Hill, Kankakee, and William L. Zink, Plano, Ill., assignors to Dunbar Kapple Inc., Geneva, Ill., a corporation of Illinois, and Sears, Roebuck and Co., Chicago, Ill., a corporation of New York Application July 25, 1947, Serial No. 763,644

4 Claims. (Cl. 280—142)

This invention relates to farm wagon gear.

It is an object of our invention to provide a wagon having a novel reach adjustment enabling the wheel base to be lengthened and shortened as desired and enabling the axles to tilt relative to each other.

Further objects and advantages of the invention will appear as the description proceeds.

The invention will be better understood upon reference to the following description and accompanying drawings, in which:

Fig. 4 is a fragmentary plan view of the chassis.

Fig. 5 is a view, partly in section and partly in elevation, taken as indicated by the line 5—5 in Figs. 4 and 6.

Fig. 6 is a fragmentary view, partly in section and partly in elevation, taken as indicated by the line 6—6 in Fig. 4.

Fig. 7 is a view, partly in section and partly in elevation, taken as indicated by the line 7—7 in Fig. 5.

Figure 1:
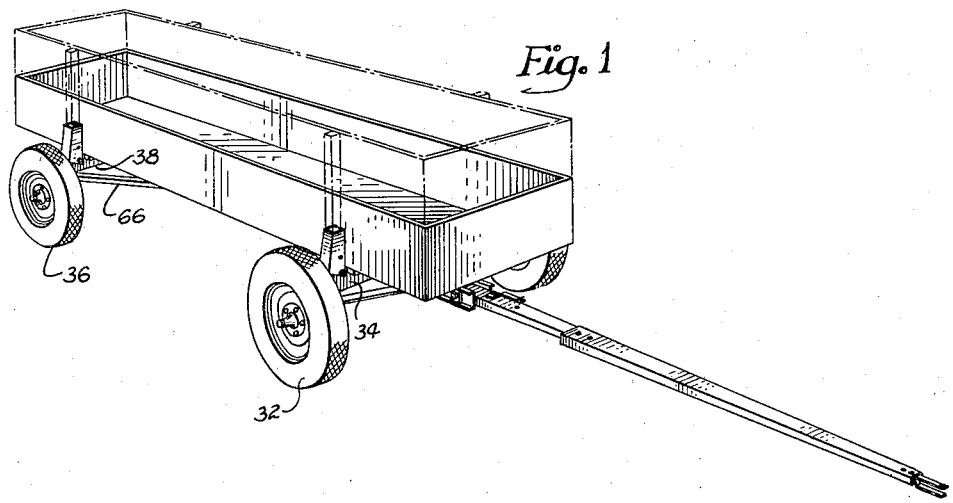
Fig. 1 is a perspective view of a wagon constructed in accordance with one form of our invention.

Referring now more particularly to the drawings, there is shown generally at 30 a wagon gear including front wheels 32, a front axle 34, rear wheels 36, a rear axle 38 and a reach construction generally indicated at 40.

The reach structure 40 comprises a front reach tube 42 welded or otherwise suitably secured to a preferably U-shaped bracket 46 welded to the front axle 34. The front reach tube 42 is stabilized by means of right and left fore hounds 50 welded to the lower end portions of the front axle 34, said hounds having parallel rear end extensions 54 respectively welded as at 55 to and extending rearwardly beyond the rear end 56 of said tube 42 (Figs. 4 to 7).

Figure 2:
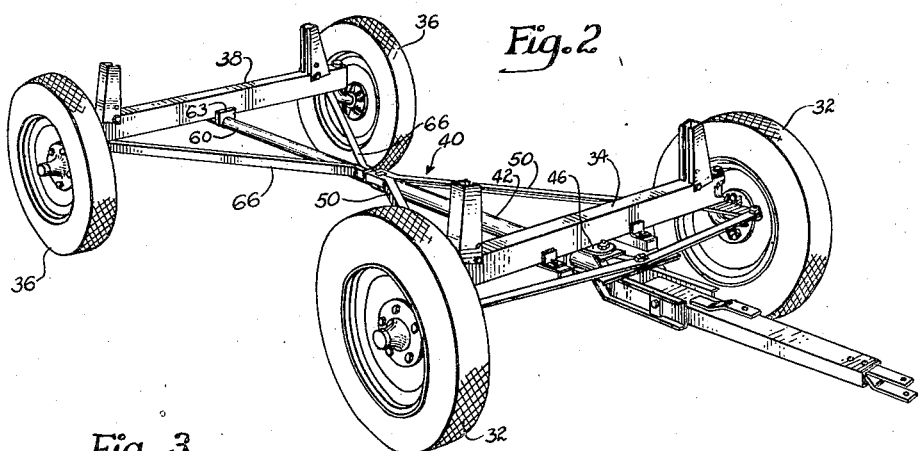
Fig. 2 is a perspective view of the chassis of Fig. 1.

Telescoped within the front reach tube 42 is a rear reach tube 60 whose rear portion is welded to the rear axle 38 and to brackets 63 welded to and depending from the rear axle (Figs. 2 and 4). Rear left and right hounds 66 are welded to the lower end portions of the rear axle 38 and to a forward portion of the rear reach tube 60.

In accordance with our invention provision is made for telescopic adjustment of the reach tubes 42 and 60 to adjust the length of the wheel base of the chassis, and provision is also made for limited swiveling or tilting of the rear axle 38 relative to the front axle 34 about the axis of said tubes. To these ends, referring more particularly to Figs. 4 to 7, we provide a sleeve 70 which may be formed of the same tubular material as the front reach tube 42 and is welded as at 71 to and within the rear extensions 54 of the fore hounds 50 in spaced relation to the rear end 56 of said tube. In said space we place a collar 72 which may also be cut from the same material as the tube 42 so that the tube 42, sleeve 70 and collar are arranged with their inner and outer surfaces substantially flush. The rear tube 60 is disposed within the sleeve 70 and collar 72 as well as the front tube 42, and is in substantially sliding longitudinal and rotary engagement therewith.

Figure 3:
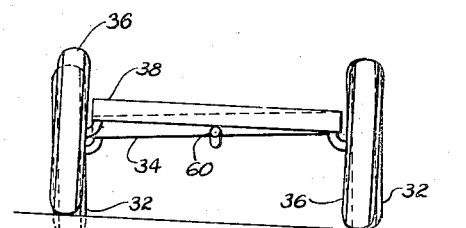
Fig. 3 is a rear end elevation showing essentially only the axles and wheels, with the rear axle tilted relative to the front axle.

The rear tube 60 has a longitudinal series of pairs of diametrically opposite holes 74, each pair being adapted to selectively receive the shank 76 of a bolt 77 whose head 78 is adapted to fit closely in a correspondingly polygonal hole 80 in the collar 72. The collar 72 has a hole 82 diametrically opposite the hole 80 but of substantially the same size as the holes 74 in the inner tube 60 to accommodate the shank 76, and a nut 84 applied to the threaded end 86 of the shank is adapted to hold the bolt in assembly with the collar. The fore hound rear extensions 54 have juxtaposed recesses or notches 88 in the upper sides thereof to provide clearance for rotary movement of the bolt head 78, the depending flanges 89 of said extensions serving as abutments for engagement with the bolt head to limit such rotary movement (Fig. 5). The collar 72 has substantially end sliding bearing engagement with the contiguous ends 56 and 90 of the front tube 42 and collar 70, respectively. This provision for rotary movement is desirable to permit the front and rear axles 34 and 38, respectively, to swing relative to each other about the axis of the reach tubes 42 and 60, such as may occur when the vehicle is traveling over uneven ground, as indicated in Fig. 3.

The longitudinal series of holes 74 in the rear reach tube 60 is provided for the purpose of enabling the reach tubes to be relatively adjusted. For this purpose, it is evident that the bolt 77 may be readily withdrawn, the tubes readjusted until another pair of holes 74 is registered with the holes 80 and 82 in the collar 72, and the bolt resecured in place.

Various modifications coming within the spirit of our invention may suggest themselves to those skilled in the art, and hence we do not wish to be limited to the specific form shown or uses mentioned, except to the extent indicated in the appended claims, which are to be interpreted as broadly as the state of the art will permit.

We claim:

1. A vehicle comprising front and rear axles, a front reach tube secured to the front axle, a rear reach tube secured to the rear axle and telescoped and rotatable within said front reach tube, front and rear hounds connected to the respective tubes and the respective axles, a sleeve connected to said front hounds rearwardly of said front tube and disposed about said rear tube, and a collar secured to and about said rear tube and disposed between said front tube and said sleeve.

2. A vehicle comprising front and rear axles, a front reach tube secured to the front axle, a rear reach tube secured to the rear axle and telescoped and rotatable within said front reach tube, front and rear hounds connected to the respective tubes and the respective axles, a sleeve connected to said front hounds rearwardly of said front tube and disposed about said rear tube, a collar disposed about said rear tube between said front tube and said sleeve, said rear tube having a longitudinal series of pairs of diametrically opposite holes, and a bolt securing said colilar to said rear tube, said bolt passing through any selected pair of said holes.

3. A vehicle comprising front and rear axles, a front reach tube secured to the front axle, a rear reach tube secured to the rear axle and telescoped and rotatable within said front reach tube, front and rear hounds connected to the respective tubes and the respective axles, a sleeve connected to said front hounds rearwardly of said front tube and disposed about said rear tube, a collar disposed about said rear tube between said front tube and said sleeve, said rear tube having a longitudinal series of pairs of diametrically opposite holes, and a bolt securing said collar to said rear tube, said bolt passing through any selected pair of said holes, said bolt having a head projecting outward beyond said collar, said front hounds having portions engageable with said head to limit rotation of said rear tube relative to said front tube.

4. A vehicle comprising front and rear axles, a front reach tube secured to the front axle, a rear reach tube secured to the rear axle and telescoped and rotatable within said front reach tube, front and rear hounds connected to the respective tubes and the respective axles, a sleeve connected to said front hounds rearwardly of said front tube and disposed about said rear tube, a collar disposed about said rear tube between said front tube and said sleeve, said rear tube having a longitudinal series of pairs of diametrically opposite holes, and a bolt securing said collar to said rear tube, said bolt passing through any selected pair of said holes, said bolt having a head projecting outward beyond said collar, said front hounds having portions engageable with said head to limit rotation of said rear tube relative to said front tube, said collar having sliding bearing engagement with the said front tube and said sleeve.

STANLEY E. HILL.
WILLIAM L. ZINK.

REFERENCES CITED

The following references are of record in the file of this patent:

UNITED STATES PATENTS

| Number | Name | Date |
| --- | --- | --- |
| 667,875 | Garrels | Feb. 12, 1901 |
| 754,318 | Keffer | Mar. 8, 1904 |
| 792,276 | Linsay | June 13, 1905 |
| 833,404 | Macduff | Oct. 16, 1906 |
| 1,191,385 | Baird | July 18, 1916 |
| 1,467,685 | Phelps | Sept. 11, 1923 |
| 1,613,728 | Schneider et al. | Jan. 11, 1927 |
| 1,886,772 | Oppenheim | Nov. 8, 1932 |
| 1,893,878 | Baldwin | Jan. 10, 1933 |
| 1,956,884 | Vorhees, Jr. | May 1, 1934 |
| 2,019,811 | Graham | Nov. 5, 1935 |
| 2,106,923 | Tuft | Feb. 1, 1938 |
| 2,115,566 | Voorhees, Jr. | Apr. 26, 1938 |
| 2,133,091 | Gettig | Oct. 11, 1938 |
| 2,309,204 | Nelson | Jan. 26, 1943 |
| 2,330,299 | McNamara | Sept. 28, 1943 |